United States Patent [19]

Cariel et al.

[11] 3,984,775

[45] Oct. 5, 1976

[54] METHOD OF TRANSMITTING INFORMATION BY RADIO

[76] Inventors: Leon Cariel, 19, rue Theodore de Banville; Moise Levy, 5, Place de la Porte Champerret, both of 75017 Paris; Hubert Zouizerate, 1, Avenue Moderne, 75019 Paris; Roger Touati, 2 Bd Maurice Berteaux, 95 Argenteuil, all of France

[22] Filed: Jan. 10, 1975

[21] Appl. No.: 540,142

Related U.S. Application Data

[63] Continuation of Ser. No. 345,461, March 27, 1973, abandoned.

[52] U.S. Cl............................. 325/55; 340/168 S; 340/311
[51] Int. Cl.².................................. H04M 11/02
[58] Field of Search ............ 179/15 BA; 340/167 R, 340/167 A, 168 S, 168 CC, 311; 328/111, 112; 325/55, 64; 178/68

[56] References Cited
UNITED STATES PATENTS

| | | | |
|---|---|---|---|
| 3,510,780 | 5/1970 | Buehrle | 178/68 |
| 3,634,826 | 1/1972 | Biedermann | 340/167 R |
| 3,768,090 | 10/1973 | Williams | 340/167 RX |

*Primary Examiner*—Benedict V. Safourek

[57] ABSTRACT

The present invention describes a method and apparatus for selectively transmitting information by radio, without causing congestion of transmission frequency bands, even if the number of users who may be called is relatively great. This object is achieved by ensuring the identification of the users by a decoding matrix provided in each of the receiver devices assigned to each of the users; the pulses characterising a call code are introduced into a shift register and compared with the decoding matrix; when the corresponding binary words are identical, the call signal of the receiver is sent whether it is a sound and/or like call, also the shift register is used to record the details corresponding to the information to be transmitted and then to present said information in alphanumerical form.

3 Claims, 7 Drawing Figures

METHOD OF TRANSMITTING INFORMATION BY RADIO

This is a continuation, of application Ser. No. 345,461, filed Mar. 27, 1973, now abandoned.

The present invention relates to a method of selective call by radio, preferably with simultaneous transmission of information appearing on one or more indicators each able to form letters, numerals, or signs.

It is known that in the methods normally used for making a selective call by radio waves, there are generally used, in a working frequency band, different frequencies relating to each user, the selection being obtained by low frequency filters comprising for example, resistance-capacitance or inductance-capacitance circuits or even tuning-fork devices. Methods of this type are generally difficult to implement due to the congestion of radio transmission bands, which very quickly limits the number of possible users of these devices. Now, in numerous fields, it is very desirable to be able to develop a method which makes it possible to call from a transmitting station a specific person, wherever that person is to be found, and to transmit to him instantaneously information which allows him to act without delay.

It is the object of the present invention to describe a method and apparatus for selectively transmitting information by radio, without causing congestion of transmission frequency bands, even if the number of users who may be called is relatively great. According to the invention, this object is achieved by ensuring the identification of the users by a decoding matrix provided in each of the receiver devices assigned to each of the users; the pulses characterising a call code are introduced into a shift register and compared with the decoding matrix; when the corresponding binary words are identical, the call signal of the receiver is sent whether it is a sound and/or like call, also according to the invention, the shift register is used to record the details corresponding to the information to be transmitted and then to present said information in alphanumerical form.

The method according to the invention and the corresponding apparatus may advantageously be used, for example, for locating persons with whom one wishes to communicate by telephone and to whom the telephone number which they should call is transmitted; for locating medical personnel assigned to a particular patient in a clinic with transmission of the patient's identification number to the personnel concerned; for the surveillance of medical parameters relating to a patient, for example, the heat-beat, and calling the medical staff concerned when the parameter observed exceeds a predetermined value; for calling an attendant in a place which is under observation as soon as an alarm is given and indicating the place to which said attendant should proceed; for synchronizing actions to be undertaken simultaneously by several specific persons; for the transmission of synchronous information, allotment of time, remote control of a person or group of persons. It is clear that it is possible to combine with the apparatus according to the invention, a micro-transmitter allowing the person called to correspond with a centre either by transmitting a signal acknowledging that the call has been received or by conversational connection.

The present invention relates to a new method for transmitting information by radio, characterised by the fact that a sequence of pulses is transmitted comprising at least one set of pulses constituted by signals transmitted on at least one frequency, the pulses having a duration chosen from two different durations $t_1$ and $t_2$; that the sequence is received, that a first binary state or another binary state is made to correspond to the pulses according to their duration and that the different binary states successively received are memorized for example in a shift register. Preferably, the sequence is a call sequence and at least one part of the binary states is compared with reference values identifying the receiver and, when they are identical, a light and/or sound warning apparatus is actuated.

In a first embodiment a set of pulses is used, constituted by signals of frequency F1 and duration $t1$ and signals of frequency F2 different to F1 and of duration $t2$ different to $t1$; in a second embodiment, a set of pulses is used, constituted by signals of frequency F, some of duration $t1$ and the others of duration $t2$, different to $t1$.

In a preferred embodiment of the invention, a method of selective call comprises the afore-described method with a call sequence and is also characterised by the fact that after the call sequence an information sequence is transmitted, comprising at least one set of pulses constituted by signals, the pulses each having a duration chosen from two different durations $t1$ and $t2$; that the aforesaid transmission is received making a first binary state or a second binary state correspond to the pulses according to their duration; that the successive binary states corresponding to the successive pulses of one set are memorized for example in a shift register; and that the information, for example in alphanumerical form, corresponding to at least one part of said binary states is indicated.

In the method according to the invention, when a call sequence is followed by an information sequence, it is advantageous to separate the two sequences by a clearing signal acting on the shift register, said signal having no effect on the indication control; this clearing signal may advantageously be formed by at least one pulse of duration $t3$ greater than $t1$ and $t2$, said pulse having the single frequency F when transmitting on a single frequency and the frequency F1 when transmitting on two frequences F1 and F2. Advantageously, it is also possible to precede the call sequence and/or follow the information sequence by a reset-to-zero signal acting on the shift register and on the indicating control associated with said register. In the case of transmission on a single frequency F, the signal to reset-to-zero is transmitted on the same said frequency F and it is constituted by at least one pulse of duration $t4$ greater than $t3$. When transmitting on two frequencies F1 and F2, said signal is constituted by at least one pulse of frequency F2 and of duration greater than $t1$ and $t2$, said duration preferably being equal to $t3$.

The present invention also relates to an apparatus for transmitting radio waves which makes it possible to implement the afore-described methods, characterised by the fact that it comprises, in the first case, at least one introduction member on which the user defines the receiver station to be called; in the second place, a programmed member transforming the details provided by the user into at least one call sequence, preferably followed by an information sequence, the call sequence corresponding to information in binary code constituted by at least one set of pulses formed, in the first place, by signals, some of duration $t1$ relating to a first binary state and the others of duration $t2$ relating to a second binary state, the possible information sequence being constituted in the same manner as the aforesaid call sequence, the two sequences preferably being separated by a clearing signal; and in third place, a transmission apparatus having an aerial for sending radio waves corresponding to the aforesaid pulses.

In a first embodiment, the set of pulses of a call sequence is formed, on the one hand, by signals of frequency F1 and duration $t1$ and, on the other hand, by signals of frequency F2 and duration $t2$; in a second embodiment, the set of pulses of a call sequence is formed by signals of frequency F, some of duration $t1$ and others of duration $t2$.

When transmitting on two different frequencies F1 and F2, the programmed member of the aforesaid transmitter apparatus precedes the call sequence and follows the information sequence by a signal to reset-to-zero, constituted by at least one pulse of frequency F2 and duration $t3$ greater than $t1$ and $t2$; the programmed member of the transmitter apparatus inserts between the call sequence and the information sequence a clearing signal constituted by at least one pulse of frequency F1 and duration greater than $t1$ and $t2$, preferably equal to $t3$. When transmitting on a single frequency F, the programmed member of the transmitter apparatus precedes the call sequence and follows the information sequence by a signal to reset-to-zero constituted by at least one pulse of frequency F and duration $t4$ greater than $t3$; the programmed member of the transmitter apparatus inserts between the call sequence and the information sequence a clearing signal constituted by at least one pulse of frequency F and duration $t3$ greater than $t1$ and $t2$.

The present invention relates to the new industrial product constituted by a receiver apparatus making it possible to implement the afore-described methods, characterised by the fact that it comprises, in the first place, an amplifier detector stage able to receive radio transmissions, constituted by signals transmitted on at least one frequency, some of duration $t1$ and others of duration $t2$ different to $t1$, and capable of possibly separating the signals corresponding to the different frequencies used; in the second place, a monostable multivibrator supplying a pulse of duration $t4$, comprised between $t1$ and $t2$ at the passage of each pulse corresponding to the reception of a pulse; in the third place, at least one shift register controlled both by signals of duration $t1$ or $t2$ and by signals of duration $t4$, each stage of the register or registers memorizing a binary position corresponding to each of the successive pulses received by radio, the pulses of duration $t1$ corresponding to one of the two binary states and the pulses of duration $t2$ to the other binary state; in the fourth place, a decoding matrix preset and specific to the receiver, the stages of the matrix being compared with certain of the stages of the shift register or registers, when said register or registers have been filled, when identity is established, the comparison allowing a warning apparatus integral with the receiver to be actuated.

In the preferred embodiment of the receiver apparatus according to the invention, certain stages of the shift register or registers are connected to at least one indicator apparatus, the actuation of which is ensured by means of a detector member which actuates it only after the shift register has been completely filled and only when the information sequence is received; in a first variation, the indicator member comprises, in the first place, at least one decoder transforming the binary information of the shift register and, in second place, an alphanumerical indicator controlled by said decoder; the alphanumerical indicator being able to be actuated by means of a switch operated by the user; the binary information supplied by the shift register is, in a variation, sent directly to the segments constituted by electroluminescent diodes or liquid crystals for forming numbers, letters or signs; a detector member is interposed between the shift register or registers and the decoding matrix in order that the warning apparatus may only be actuated when the register is completely full; when transmissions take place on two frequencies, the two first pulses of the sets of signals constituting the call sequence have different frequencies; the detector member interposed between the decoding matrix and the shift register is an "AND" circuit, the inputs of which are connected firstly to the stages of the register relating to the particular code identifying the call sequence and, secondly, to the stage of the register which memorizes the last pulse of a set of signals, said pulse corresponding to the second binary state assigned to the pulses of duration $t2$; the detector member interposed between the shift register and the indicator device is an AND circuit the inputs of which are connected in a similar manner to that used for the connection of the aforesaid AND circuit associated with the decoding matrix, said detector member also comprising another input connected to the output of a bistable trigger, the position of which is modified, firstly by the operation of the warning apparatus and secondly by the passage of reset-to-zero pulses, which follow the information sequence.

In a variation of the receiver apparatus according to the invention, the shift register comprises (N + 3) stages, N being the number of code inputs of the decoder associated with a single indicator apparatus. In a second variation, the receiver apparatus comprises several indicator apparatuses possibly associated with a single decoder, each indicator apparatus also being connected to one of the stages of the shift register or registers. When the single decoder comprises N code inputs connected to N stages of the shift register, if the receiver apparatus comprises P indicator apparatuses, the shift register comprises (N , P + 3) stages. In a third variation, the receiver apparatus according to the invention comprises P indicator apparatuses, each possibly connected to a decoder and the shift register or registers comprise (N. P) + 3 stages, N being the number of code inputs of each decoder associated with an indicator apparatus.

It is clear that the call sequences may comprise a repetition of sets of pulses, the passage of each set causing the production of a warning signal such as a sound signal for example: thus, by sending a series of sets of pulses, it is possible to prolong the call for a predetermined time. Similarly, in the information sequence, it is possible to transmit a repetition of sets of pulses, each in turn constituting a complete unit of information; thus, each time a set is received, a momentary indication is obtained and the various successive sets may be transmitted sufficiently close to each other in order that the successive indications appear to produce a continuous indication by virtue of the manner in which the retina retains an image. According to the number of successive sets transmitted, it is thus possible, in the particular case of a momentary light indication, to obtain a visualisation of the information for the desired time.

For a better understanding of the object of the invention, several embodiments illustrated diagrammatically in the accompanying drawings will now be described as purely illustrative and non-limiting examples. In the drawings.

Figure 1:
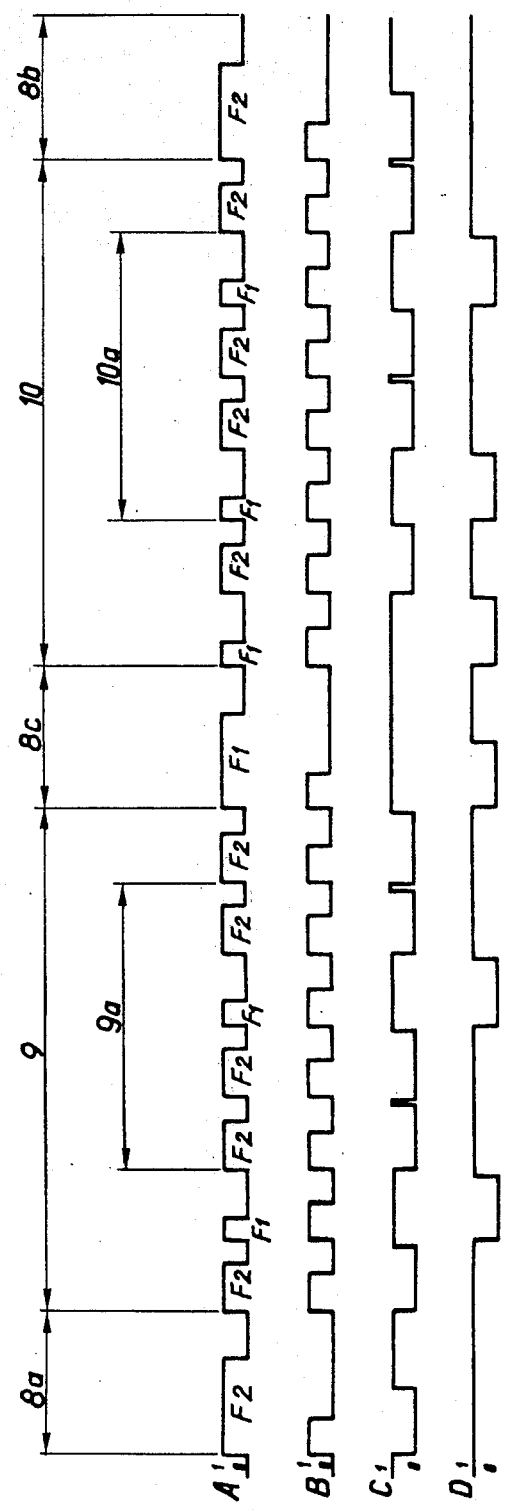
FIG. 1 illustrates diagrammatically the pulses transmitted and produced on two different frequencies F1 and F2 during a call sequence followed by an information sequence, each sequence comprising a single set of signals.
Figure 2:
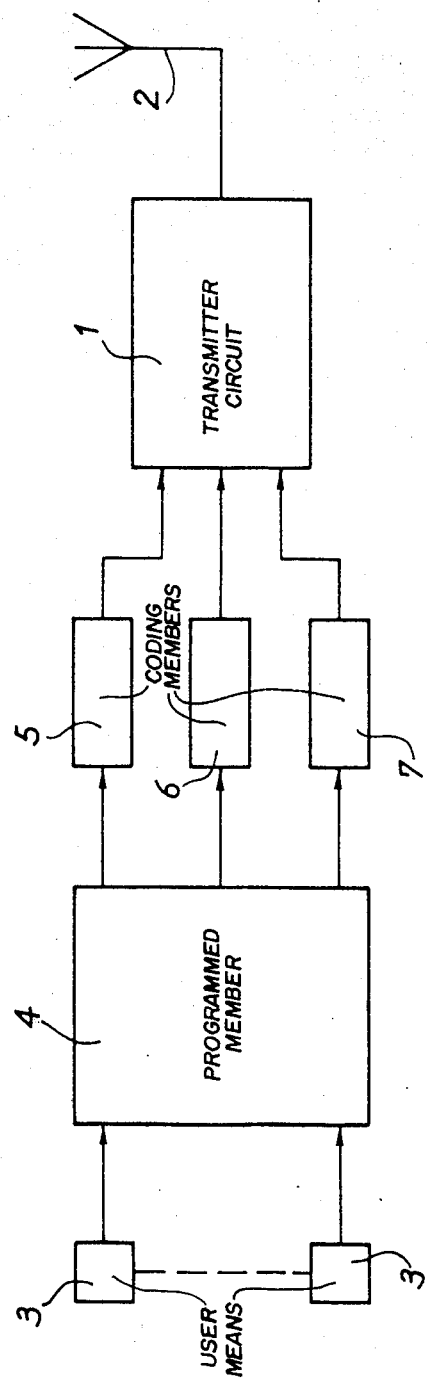
FIG. 2 is the circuit diagram of a transmitter for implementing the method according to the invention.
Figure 3:
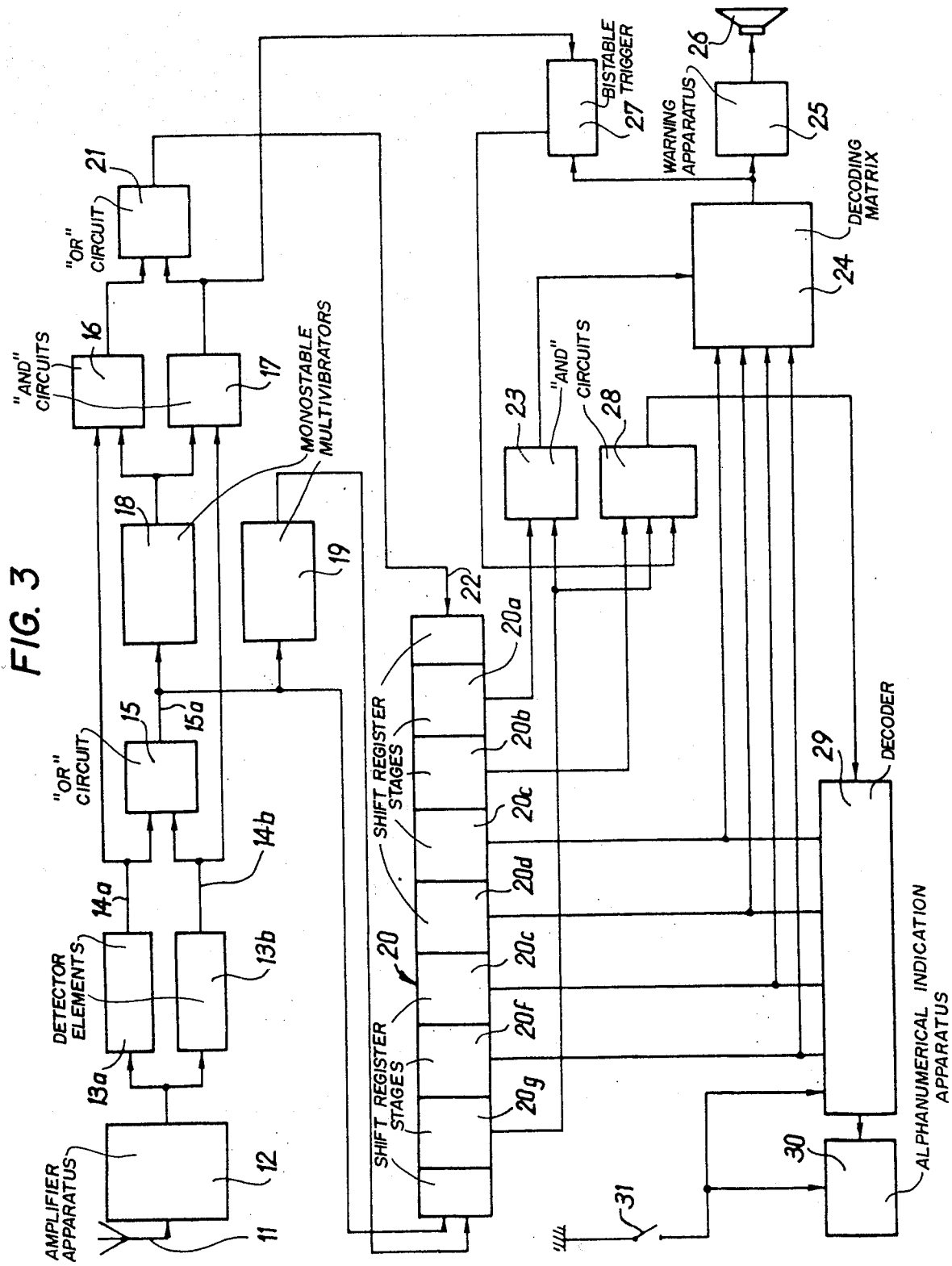
FIG. 3 is the circuit diagram of a receiver for implementing the method according to the invention.

With reference to FIGS. 1 to 3, it will be seen that the reference numeral 1 designates the transmitter circuit of the transmitter apparatus according to the invention, transmission taking place by means of the aerial 2. The user who causes transmission, acts on means 3 for introducing information, which transmit their details to a programmed member 4. The programmed member 4 transforms the details which it has received from the members 3 and supplies them to coding members 5, 6 and 7. In the first place, at the beginning and end of transmission, the coding member 5 sends the signals 8a, 8b defined on line A of FIG. 1: these signals have a frequency F2. The member 5 also sends the clearing signal 8c which separates a call sequence 9 and an information sequence 10. The pulse 8c is transmitted at frequency F1. The pulses corresponding to the signals to reset-to-zero and the clearing signals 8a, 8b, 8c have a duration equal to $2t$, $t$ being an arbitrary unit of time.

The member 6 transmits the call sequence 9. This sequence is a combination of pulses of frequency F2 and duration equal to $t$ and pulses of frequency F1 and duration equal to $0.5t$. At the beginning of the sequence 9, there may be found in succession a pulse F2 and a pulse F1 which make it possible to identify the sequence 9 with respect to the sequence 10 which, on the contrary, begins with a pulse F1 followed by a pulse F2. The sequence 9 is terminated by a pulse F2. In the central part 9a of the sequence 9, a combination of pulses is transmitted corresponding to the code number of the receiver apparatus that it is desired to call: in the case shown, it is assumed that the coding takes place by means of four binary elements and thus in the region 9a there is a succession of four signals which correspond, as will be seen hereafter, for the pulses F2 to a binary state 1 and for the pulses F1 to a binary state zero.

In the sequence 10, which is transmitted by the coding member 7, there are similarly two starting pulses, as previously described, and a final pulse, which is constituted by a pulse F2. Like the sequence 9, the sequence 10 comprises a combination of pulses of frequency F2 and duration equal to $t$ and pulses of frequency F1 and duration equal to $0.5t$. In the central part 10a of the sequence 10, there is found a combination of pulses corresponding to the information that it is desired to send to the receiver apparatus called by means of the sequence 9. As will be seen hereafter, in the example described, the pulses F1 correspond to a binary state zero and the pulses F2 to a binary state 1. The binary number which is transmitted as information in the example illustrated on line A of FIG. 1, is thus the number 0110.

With reference to FIG. 3, it will be seen that the receiver apparatus according to the invention comprises an aerial 11 connected to an amplifier apparatus 12 which supplies two detector elements 13a, 13b respectively allowing the signals corresponding to the frequencies F1 and F2 to pass. The two output lines 14a, 14b of the detectors 13a, 13b respectively on the one hand supply an "OR" circuit 15 and on the other hand for the line 14a, and AND circuit 16 and for the line 14b an AND circuit 17. The output 15a of the OR circuit 15 is connected, in the first place, to a monostable multivibrator 18, in the second place, to a monostable multivibrator 19 and in the third place to the input of a shift register 20. The output of the monostable 18 is connected to the input of the AND circuits 16 and 17. The output of the monostable 19 is connected to the input of the shift register 20. The outputs of the AND circuits 16 and 17 are connected to an OR circuit 21. The output of the OR circuit 21 controls the reset-to-zero 22 of the shift register 20.

In FIG. 1, line B represents the pulses coming from the monostable 19 when receiving the transmissions whose signals are represented on line A of FIG. 1. Lines C and D of FIG. 1 represent the pulses coming from the monostable 13, the line C corresponding to the pulses produced by the pulses of frequency F2, and line D to the pulses produced by the pulses of frequency F1.

The shift register 20 comprises seven stages designated respectively by 20a, 20b, 20c, 20d, 20e, 20f, 20g. The two inputs of an AND circuit 23 are connected to the stages 20a and 20g. The output of the circuit 23 is connected to a decoding matrix 24 which does or does not allow the supply of a warning apparatus 25 ensuring the operation of a loudspeaker 26. The signal coming from the decoding matrix 24 is also sent to a bistable trigger 27; the production of the signal causes the transition of the trigger to position 1. The trigger 27 is also connected to the output of the AND circuit 17 and a signal coming from the circuit 17 causes the transition of the trigger 27 into the position O. The output of the trigger 27 is connected to one of the inputs of an AND circuit 28, the two other inputs of which are respectively connected to the stage 20b and to the stage 20g of the shift register 20. The four stages 20c, 20d, 20e, 20f of the shift register 20 are connected to a decoder 29 which may be blocked by the output of the AND circuit 28. The output of the decoder 29 controls an alphanumerical indication apparatus 30 which is supplied electrically by means of a manually controlled switch 31, thus ensuring the supply of the decoder 29.

When the pulse of the reset-to-zero signal 8a is picked up by the aerial 11, it produces in the line 14b a pulse of equivalent duration, said pulse passing through the circuit 15 to the input of the monostable 18, which produces a pulse of duration $1.4t$. During this pulse, one is at the level zero (not supplied) whereas in the absence of the pulse, one is at the level 1 (supplied). Since the pulse of the signal 8a has a duration 2t, the two inputs of the circuit 17 are supplied simultaneously at the level 1 for a period equal to 0.6t . . . which causes the transition of the bistable 27 to the position zero and the operation of the reset-to-zero 22 of the shift register 20. In the call sequence 9, the pulses of frequency F2 produce pulses of corresponding duration on the line 14b and pulses of frequency F1 cause pulses of corresponding duration on the line 14a. In all cases, the pulses concerned pass through the circuit 15 and are supplied to the output 15 throughout the duration of the pulse concerned. This supply causes the transition of the monostable 19 and thus the production of a pulse of duration 0.75t. When the pulse thus obtained from the monostable 19 ceases, the shift register 20 records in its first stage 20g, the value of the supply level of the output 15a.

It will thus be noted that when a pulse emitted has a frequency F2, a supply level 1 will be registered in the relevant stage of the shift register 20, whereas for a pulse emitted at a frequency F1, there will be a supply level zero. When the value 1 has been assigned to the first stage 20g of the shift register 20, at the time when the value corresponding to the next pulse is registered in the register the new value is assigned to the stage 20g, whilst the former is transferred to the stage 20f. It will thus be seen that successively the value initially registered in stage 20g will be transported to the stage 20a: this stage will have been reached when the level corresponding to the last pulse of the sequence 9 has been registered in the stage 20g.

At this moment, taking into account the nature of the signals represented on line A of FIG. 1, it will be noted that the two inputs of the AND circuit 23 are at the same level 1, such that the circuit 23 authorises the supply of the warning apparatus 25 provided that the decoding matrix 24 is identical in its distribution of levels to the levels registered in stages 20c, 20d, 20e, 20f of the shift register 20. This identity proves that the call was indeed intended for the receiver concerned. If there is no identity, the warning apparatus 25 does not function. If there is identity, a sound signal is emitted by means of the loadspeaker 26 and this signal allows the user to press the button 31 to be able to receive the information intended for him.

In practice it is clear that several sequences 9 could be sent in succession in order to transmit the sound signal for a sufficiently long time in order that the user has time to press the button 31 before the transmission of information sequences 10 begins.

It is appropriate to note that in this state of transmission, the level zero at stage 20b, due to the AND circuit 28, prevents the supply of the decoder 29 so that it does not produce any indication on the apparatus 30, even if the switch 31 is closed.

When the clearing pulse of the signal 8c is received by the serial 11, a pulse of the same duration is obtained on line 14a and for a period equal to 0.6t, . . . both feeds of the AND circuit 16 are at level 1 such that, by means of the OR circuit 21, its output supplies the reset-to-zero 22 of the shift register 20. However, it should be noted that the passage of this signal 8c in no way alters the position of the bistable trigger 27.

Having reset all the stages of the register 20 to zero, one proceeds to the memorization in the shift register 20 of the various levels corresponding to the various pulses of the sequence 10. As has been explained in detail previously, each pulse of frequency 22 corresponds to a level 1, at the time when it is compared with the pulse produced by the monostable 19; on the contrary, a pulse corresponding to a signal of frequency F1 corresponds to the level zero. When the register 20 is filled by means of seven pulses of the sequence 10, it will be noted that the stage 20a comprises the level zero, which blocks the AND circuit 23 and prevents the warning apparatus 25 from functioning. On the other hand, the three inputs of the AND circuit 28 are at level 1 since the trigger 27 has not moved and its output was previously at level 1. It is thus possible to supply the decoder 29 and, assuming that the switch 31 is closed, the decoder 29 transforms the binary information contained in the stages 20c, 20d, 20e, 20f of the shift register 20 so as to present them as alphanumerical characters on the apparatus 30. When the reset-to-zero signal 8b occurs the same phenomenon is produced as when signal 8a occurs, such that firstly the contents of the register 20 are cleared and secondly the output of the bistable trigger 27 is reset-to-zero.

It will be noted that the apparatus which has been described, after a call, makes it possible to produced sixteen characters or signs obtained by a decoder having four code inputs. It is also clear that it is possible to indicate as many characters as described by consequently increasing the number of stages of the shift register, this number always being equal to N+ 3, N being the number of code inputs. In the case (not shown on the drawing) when the seven segments of an indicator are controlled directly by the stages of a shift register, without the intermediary of the decoder 29, since each segment is constituted by an arrangement of electroluminescent diodes or liquid crystals, it is appropriate that the shift register has ten stages for an indicator. It is also clear that in the transmission the information sequences 10 may be repeated many times in order that the illumination obtained on an indicator of this type, although produced by successive pulses, gives the appearance of a fixed illumination due to the ability of the retina to retain an image.

Figure 4:
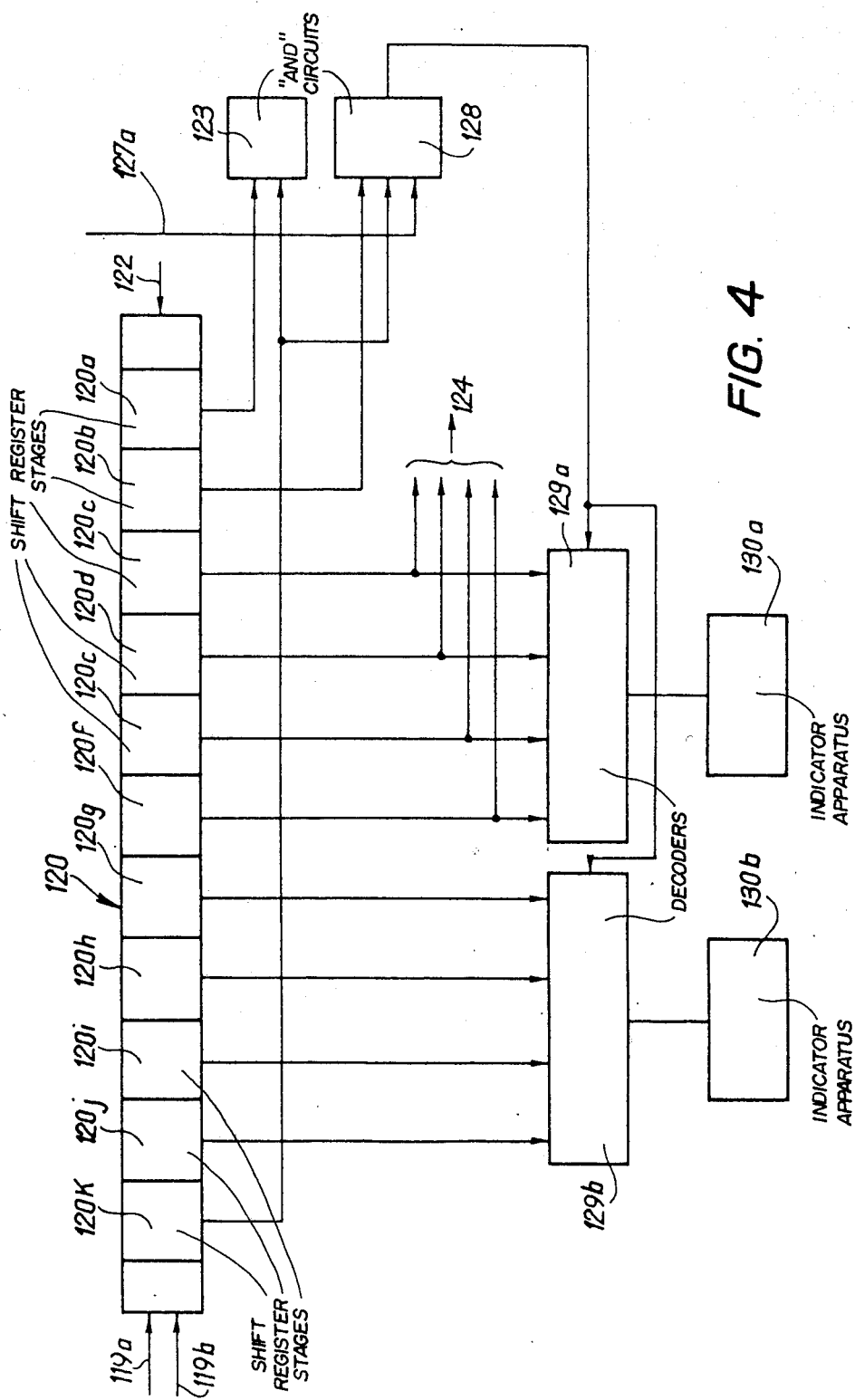
FIG. 4 illustrates a first variation of the indicator part of the apparatus of FIG. 3.

FIG. 4. shows a variation of the part of the apparatus of FIG. 3. which corresponnds to the indication. In this figure, it will be seen that the shift register 120 has eleven stages; the reference numeral 122 designates the reset-to-zero control and 119a and 119b its two feeds. The end stage 120a and its opposite number 120k are connected to the two inputs of an AND circuit 123 fulfilling the function of the AND circuit 23. Likewise, the stages 120b and 120k are connected to two of the inputs of an AND circuit 128, the third input 127a being connected to a bistable trigger 127 not shown in the drawing and similar to the trigger 27. The stages 120c, 120d, 120e, 120f are firstly connected to a decoder 120a and secondly to a decoding matrix 124 not shown in the drawing. The decoder 129a is supplied by the intermediary of the AND circuit 128 and it controls an indicator apparatus having seven segments 130a. A second decoder 129b is connected to the stages 120g, 120h, 120i, 120j, of the register 120, but supplied by the intermediary of the AND circuit 128; it controls an indicator apparatus 130b.

In this variation, after the passage of a sequence 9, when four levels placed in the stages 120c, 120d, 120e, 120f have been memorized in the register 120, they are compared with the decoding matrix 124 and if they are identical, the desired call is obtained as aforedescribed. Now, if the register 120 memorizes the levels zero or 1 corresponding to an information sequence 1, it will be seen that, since the circuit 128 authorizes the supply of two decoders 120a, 120b, it is possible to transfer the information of stages 120c, to 120f to the indicating apparatus 130a and the information relating to the stages 120g and 120j to the indicating apparatus 130b. Thus, by means of a single shift register, indications are provided on two separate indicator apparatuses. It is clear that one could also use several shift registers for obtaining the same result.

Figure 5:
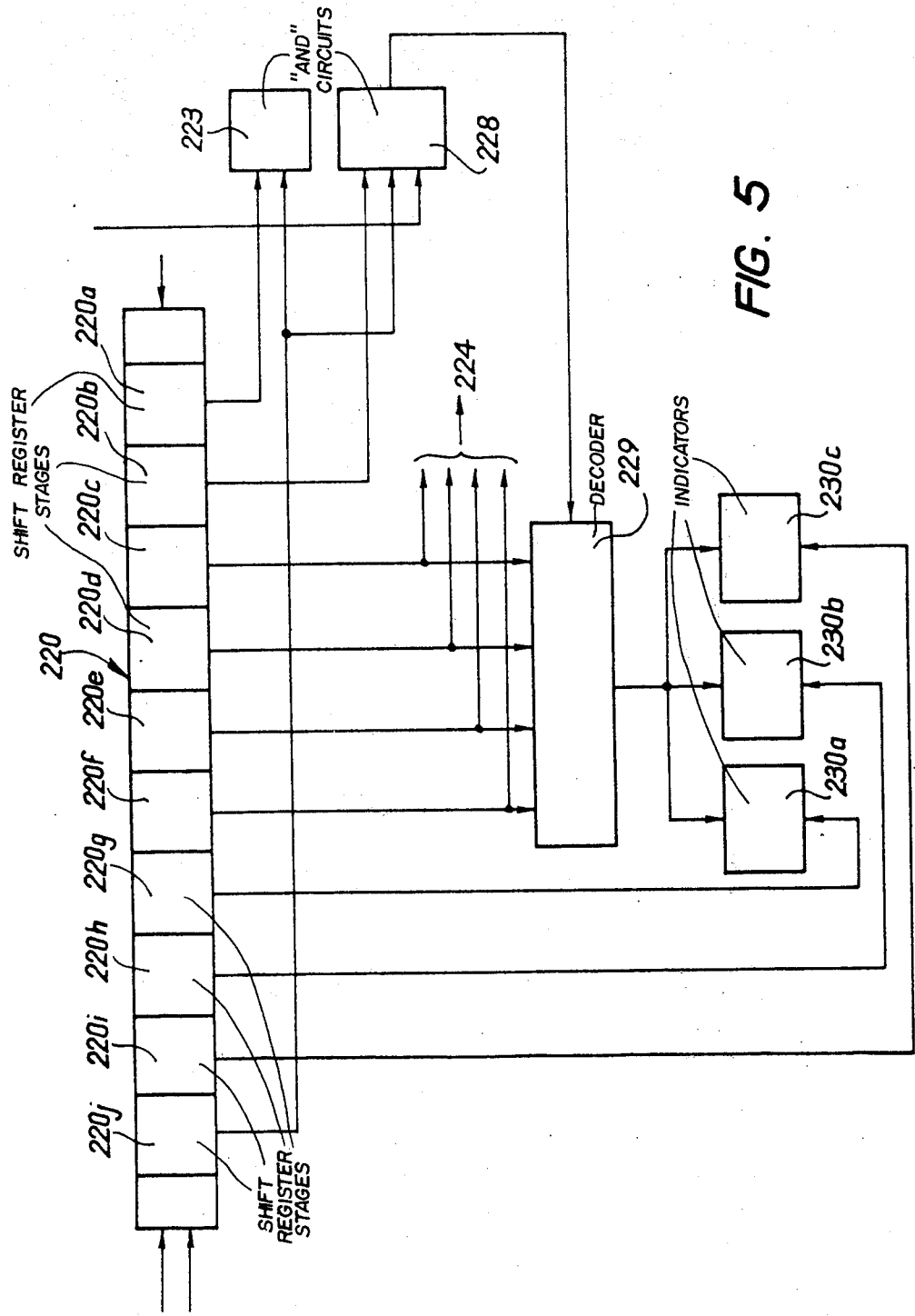
FIG. 5 represents a second variation of the indicator part of the receiver apparatus of FIG. 3.

In another variation illustrated in FIG. 5 and also relating to the indicator part of the receiver apparatus of FIG. 3, there is illustrated a combination of a shift register 220 comprising 10 stages with a decoder apparatus 229 and three indicator apparatuses 230a, 230b, 230c. There are still associated with the shift register 220, two AND circuits 223 and 228 respectively similar to the AND circuits 23 and 28 of the apparatus of FIG. 3. The decoding matrix, which is compared with the levels 1 or zero obtained in the shift register 220 has been designated by the reference numeral 224 and not shown in the drawing. The decoding matrix 224 is compared with the contents of stages 220c to 220f of the register 220. At the time when the register 220 memorizes the levels corresponding to an information sequence 10, the information sent to the decoder 229 is intended for one of the three indicators 230a, 230b, 230c and this indicator is determined by the level 1 which must exit in the corresponding stage to which it is connected; in fact, each of the indicators 230a, 230b, 230c is connected to one of the stages 220g, 220h, 220i, and the information sequence 10 comprises three sets of pulses separated by clearing signals, the first set having pulses corresponding to a level 1 in the stage 220g and to a level zero in the two stages 220h and 220i, the second set leading to a level 1 in the stage 220h and the third set to a level 1 in the stage 220i. It is thus noted that each set may be selectively directed to one of the indicators associated with the single decoder 229 which makes it possible with a single register comprising (N + P + 3) stages, N being the number of code inputs of the single decoder and P being the number of indicators, to obtain a result equivalent to that of the apparatus of FIG. 3.

Figure 6:
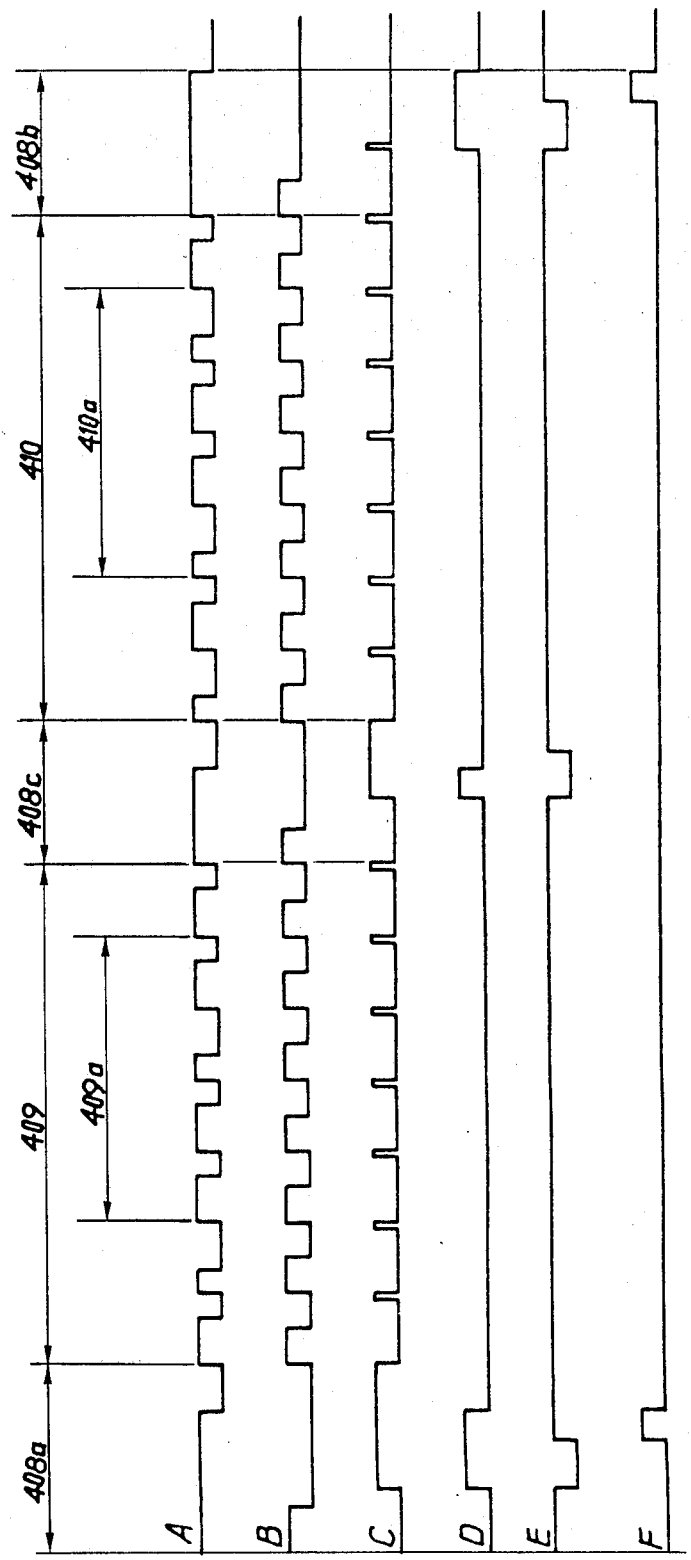
FIG. 6 illustrates diagrammatically the pulses transmitted and produced on a single frequency during a call sequence followed by an information sequence, each sequence comprising a single set of signals.
Figure 7:
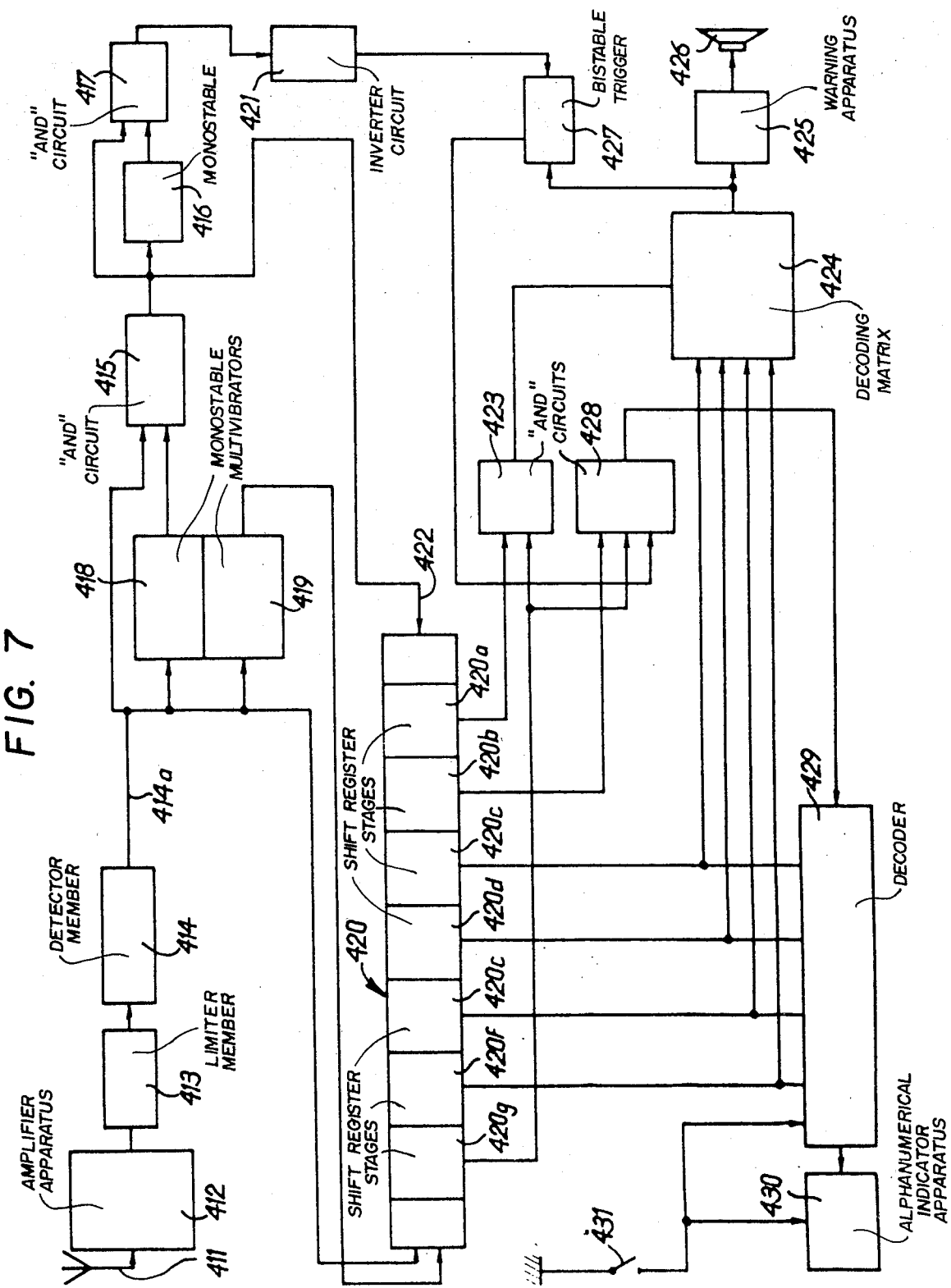
FIG. 7 is the circuit diagram of a receiver for implementing the method corresponding to the transmissions of FIG. 6.

FIG. 6 and 7 illustrate a second embodiment of implementing the method according to the invention, the corresponding apparatuses using a single frequency F. The transmitter apparatus is identical to that which was illustrated in FIG. 2 and described previously apart from the sole difference that the transmission takes place on a single frequency F in place of on two separate frequencies F1 and F2. Thus, the diagrammatic illustration of FIG. 2 has not been repeated, which may serve both for illustrating the transmitter apparatus of the first embodiment and for illustrating the transmitter apparatus of the second embodiment.

Thus, with reference to FIGS. 2, 6 and 7, it will be noted that the transmitter circuit of the transmitter apparatus according to the invention is designated by the reference numeral 1, transmission taking place by means of the aerial 2. The user, who causes transmission, acts on means 3 for introducing information, which transmit their details to a programmed member 4. The programmed member 4 transforms the details which it has received from the members 3 and supplies them to the coding members 5, 6 and 7. In the first place, at the beginning and end of transmission, the coding member 5 sends the signals 408 and 408b shown on line A of FIG. 6; the member 5 also sends the clearing signal 408c which separates a call sequence 409 and an information sequence 410; the pulses corresponding to the reset-to-zero and clearing signals 408a and 408b have a duration equal to 3t, the pulse corresponding to the reset-to-zero signal 408c has a duration equal to 2t, t being an arbitrary unit of time.

The member 6 transmits the call sequence 409. This sequence is a combination of pulses of duration equal to t and pulses of duration equal to 0.5t. At the beginning of the sequence 409, there is located in sequence, a pulse of duration t and a pulse of duration 0.5t which make it possible to identify the sequence 409 with respect to the sequence 410 which, on the contrary, begins with a pulse of duration 0.5t, followed by a pulse of duration t. Nevertheless, the number of pulses contained in these identification codes may be greater than that used in the present description and may have diverse configurations. The sequence 409 is terminated by a pulse of duration t. In the central part 409a of the sequence 409, a combination of pulses is transmitted which corresponds to the code number of the receiver device that it is desired to call; in the case illustrated it is assumed that the coding takes place by means of four binary elements and thus in the region 409a there is a succession of four signals which correspond, as will be seen hereafter for pulses of duration t to a binary state 1 and for pulses of duration 0.5t to a binary state zero.

In the sequence 410, which is transmitted by the coding member 7, there are likewise two initial pulses, as described previously and one final pulse, which is constituted by a pulse of duration t. Like the sequence 409, the sequence 410 comprises a combination of pulses of duration equal to t, and pulses of duration equal to 0.5t. In the central part 410a of the sequence 410, a combination of pulses is found corresponding to the information that it is desired to send to the receiver apparatus called by means of the sequence 409. As will be seen hereafter, pulses of duration 0.5t correspond, in the example described, to a binary state zero and pulses of duration t to a binary state 1. The binary number which is transmitted as information in the example illustrated on line A of FIG. 6 is thus the number 0110.

With reference to FIG. 7, it will be seen that the receiver apparatus according to the invention comprises an aerial 411 connected to an amplifier apparatus 412 which supplies a limiter member 413 and a detector member 414 allowng signals corresponding to frequency F to pass. The output line 414a of the detector 414 firstly supplies an AND circuit 415 and secondly, in the first place monostable multivibrator 413, secondly a monostable multivibrator 419 and thirdly a first input of a shift register 420. The output of the monostable 413 is connected to the input of the AND circuit 415. The output of the monostable 419 is connected to a second input of the shift register 420. The output of the AND circuit 415 controls a monostable 416 and an AND circuit 417, one input of which is connected to the output of the monostable 416. The output of the AND circuit 417 is connected to an inverter which controls the reset-to-zero of the trigger 427. The output of the AND circuit 415 controls the reset-to-zero 422 of the shift register 420.

In FIG. 6, line B represents the pulses coming from the monostable 419, at the time of receiving transmissions whose signals are represented on line A of the figure. Line C of FIG. 6 represents the pulses 420 coming from the monostable 418. Line D represents the reset-to-zero pulses of the shift register supplied by the AND circuit 415. Line E represents the pulses supplied by the monostable 416. Line F represents the reset-to-zero pulses of the trigger 427, supplied by the AND circuit 417 before passing into the inverter 421.

For the example chosen, the shift register 420 comprises seven stages designated respectively by the reference numerals 420a, 420b, 420c, 420d, 420e, 420f, 420g. The two inputs of an AND circuit 423 are connected to the stages 420a and 420g. The output of the circuit 423 is connected to a decoding matrix 424 which does or does not allow the supply of a warning apparatus 423 ensuring the functioning of a loudspeaker 426. The signal coming from the decoding matrix 424 is also sent to a bistable trigger 427; the production of the signal produces transition of the trigger to position 1. The trigger 427 is also connected to the output of the inverter circuit 421 and a signal coming from the circuit 421 causes the transition of the trigger 427 to the position zero. The output of the trigger 427 is connected to one of the inputs of an AND circuit 428, the two other inputs of which are respectively connected to the stage 420b and to the stage 420g of the shift register 420. The four stages 420c, 420d, 420e, 420f of the shift register 420 are connected to a decoder 429 which may be blocked by the output of the AND circuit 428. The output of the decoder 429 controls an alphanumerical indicator apparatus 438 which is supplied electrically by the intermediary of a manually operated switch 431, also ensuring the supply of the decoder 429.

When the pulse of the reset-to-zero signal 408a is picked up by the aerial 411, it produces in the line 414a a pulse of equivalent duration, said pulse reaching the input of the monostable 418, which produces a pulse of duration 1.4t. During this pulse, the level zero is present (not supplied) whereas in the absence of the pulse, the level 1 (supplied) is present. Since the pulse of the signal 408a has a duration of 3t, the two inputs of the circuit 415 are simultaneously supplied at level 1 for a time equal to 1.6t. This pulse of duration 1.6t arrives at the monostable 416, the output of which passes from level 1 to level zero during a time t. Since at the same time the circuit 417 receives a pulse of level 1 of duration 1.6t and a pulse of level zero of duration t, it supplies a pulse of duration 0.6t and of level 1, which is transformed into a pulse of level zero by the inverter member 421, which causes the transition of the trigger 427 to the position zero. Each time a pulse of duration t or 0.5t appears on the line 414a, the monostable supplies a pulse of duration 0.75t. The shift register 420 registers the level of the line 414a in its first stage 420g when the pulse of duration 0.75t ceases.

It may thus be stated that when a pulse is emitted of duration t, there will be registered in the respective stage of the shift register 420, a supply level 1, whereas for a pulse emitted of duration 0.5t, there will be a supply level zero. When the value 1 has been assigned to the first stage 420g of the shift register 420, at the time of registration in the register of the value corresponding to the next pulse, the new value is assigned to the stage 420g whereas the former value is transferred to the stage 420f. It will thus be seen that successively the value initially registered in the stage 420g will be transported to the stage 420a: this state will be reached when the level corresponding to the last pulse of the sequence 409 has been registered in the stage 420g.

At this time, taking into account the nature of the signals represented on line A of FIG. 6, it may be stated that the two inputs of the AND circuit 23 are at the same level 1 such that the circuit 423 authorises the supply of the warning apparatus 423 providing that the decoding matrix 424 is identical in its distribution of levels, to the levels recorded in the stages 420c, 420d, 420e, 420f of the shift register 420. This identity proves that the call was indeed intended for the receiver concerned. If there is identity a second signal is emitted by means of the loudspeaker 426 and this signal allows the user to press the switch 431 in order to be able to receive the information intended for him.

In practice, it is clear that several sequences 409 may be sent in succession in order to emit the sound signal for a sufficiently long period of time in order that the user has time to press the switch 431 before the transmission of information sequences 410 begins.

It is appropriate to note that in this state of the transmission, one level zero in the stage 420b prevents the supply of the decoder 429 by means of the AND circuit 428 such that no indication is produced on the apparatus 430 even if the switch 431 is closed.

When the clearing pulse of the signal 408c is received by the aerial 411, a pulse of the same duration is obtained on line 414a and for a time equal to 0.6t, the two inputs of the AND circuit 415 are at level 1 such that its output supplies the reset-to-zero 422 of the shift register 420. However, it should be stated that the passage of this signal 408c in no way changes the position of the bistabel trigger 427.

When all the stages of the register 420 have been reset-to-zero, the different levels corresponding to the various pulses of the sequences 410 are memorized in the shift register 420. As has been explained in detail previously, each pulse of duration t corresponds to a level 1, at the time when it is compared with the pulse produced by the monostable 419; on the contrary, a pulse corresponding to a signal of duration 0.5t corresponds to the level zero. When the register 420 has been filled by means of seven pulses of sequences 410, it will be noted that the stage 420a comprises the level zero which blocks the AND circuit 423 and prevents the warning apparatus 425 from functing. On the other hand, the three inputs of the AND circuit 428 are at level 1 since the trigger 427 has not moved and its output was previously at level 1. Thus, the decoder 429 may be supplied, and assuming that the switch 431 is closed, the decoder 429 transforms the binary information contained in stages 420c, 420d, 420e, 420f of the shift register 420 in order to present them as alphanumerical characters on the apparatus 430. When the signal to reset-to-zero 408b occurs, the same phenomenon occurs as at the time of the signal 408a such that on the one hand the contents of the register 420 are cleared and on the other hand the output of the bistable trigger 427 is reset-to-zero.

It should be noted that the apparatus having one frequency which has been described, after a call, makes it possible to produce an indication of 16 characters or signs obtained by a decoder having four code inputs. It is clear that it is possible to present as many characters as desired by consequently increasing the number of stages of the shift register, this number always being equal to N + 3, N being the number of code inputs. In the case not shown in the drawing when the seven segments of an indicator are controlled directly by the stages of a shift register, without the intermediary of a decoder 420, since each segment is constituted by an arrangement of electroluminescent diodes or liquid crystals, for the example chosen it is appropriate that the shift register has ten stages for one indicator. It is quite clear that in the transmission, the information sequences 41 may be repeated many times such that the illumination obtained on an indicator of this type, although produced by successive pulses, appears to produce a fixed illumination due to the ability of the retina to retain an image.

It is understood that the aforedescribed embodiments are in no way limiting and may give rise to any desirable modifications without diverging from the framework of the invention.

A particularly simple variation would consist in transmitting the sequence of pulses of the invention by means of two frequencies $F_H$ and $F_B$ controlling the transmission of the frequency $F_H$ during the upper levels of the sequence of pulses and the frequency $F_B$ the lower levels of the sequence of pulses. Moreover, the frequency $F_H$ thus fulfils the same function as the single frequency F considered above.

What is claimed is:

1. System for selectively alarming persons, having a transmitter and a plurality of receivers, the transmitter comprising:
   input means controllable for defining a first digital information selectively associated to a person to be alarmed, and a second digital information to be transmitted to said person,
   binary encoding means for converting said first and second digital information into a first binary sequence for calling and a second binary sequence for information and,
   means adapted to transmit pulses of electromagnetic radiation, in the form of a calling sequence of pulses having an initial pulse, followed by a predetermined number of pulses of duration $t1$ or $t2$, depending on said first binary sequence, and of a sequence of information having a starting-information pulse followed by the same number of pulses of duration $t1$ or $t2$, depending on said second binary sequence, with the initial pulse and starting-information pulse both having a duration greater than $t1$ and $t2$, and the initial pulse further having a duration greater than that of the starting information pulse;

and each receiver comprising:
   receiver means to receive said electromagnetic radiation and recover the pulses thereon,
   a first monostable multivibrator coupled to the receiver means and operative upon the leading edges of each output pulse of the receiver means to deliver first reference pulses having a duration comprised between $t1$ and $t2$,
   shift register means receiving both said pulses of duration $t1$ or $t2$ and said first reference pulses for sequentially storing one or the other binary state upon each pulse of the sequence when its duration exceeds or not the duration of the simultaneous reference pulse, respectively,
   a decoding matrix being coupled to a first portion of the shift register means for delivering an output indicating when said first portion of the shift register means contains a predetermined sequence of binary information associated to the receiver,
   warning means responsive to said output indication of the decoding means,
   a second monostable multivibrator coupled to the receiver and operative upon each leading edge of an output pulse thereof to deliver a second reference pulse having a duration greater than both durations $t1$ and $t2$ but lower than the duration of said initial pulse and said information-starting pulse,
   first logic gate means connected to said receiver means and second monostable multivibrator, to give an output indicating the part of the duration of an incoming pulse in excess of that of the simultaneous second reference pulse, the first logic gate means being coupled to said shift register means to reset it when a received pulse exceeds the duration of said second reference pulse,
   a bistable means coupled to the output of the decoding matrix for being set when said output indicates the predetermined sequence being contained in said first portion of the shift register,
   means coupled to the output of the first logic gate means to discriminate said initial pulse from said starting-information pulse and to reset the bistable means in response to the initial pulse,
   an alphanumerical display means,
   another decoder having an enabling input and being coupled between a second portion of the shift register means and the alphanumerical display means to decode the binary information of the shift register means and correspondingly control the alphanumeric display means, and
   second logic means connected at least to said bistable means and coupled to said other decoder to enable it when the bistable means is set, indicating that a sequence of information is received.

2. Receiver for use in a system for selectively alarming persons by transmitting pulses of electromagnetic radiation, in the form of a calling sequence of pulses having an initial pulse, followed by a predetermined number of pulses of duration $t1$ or $t2$, and a sequence of information having a starting-information pulse followed by the same number of pulses of duration $t1$ or $t2$, with the initial pulse and starting-information pulse both having a duration greater than $t1$ and $t2$, and the initial pulse further having a duration greater than that of the starting-information pulse, said receiver comprising:
   receiver means to receive said electromagnetic radiation and recover the pulses thereon,
   a first monostable multivibrator coupled to the receiver means and operative upon the leading edges of each output pulse of the receiver means to deliver first reference pulses having a duration comprised between $t1$ and $t2$,
   shift register means receiving both said pulses of duration $t1$ and $t2$ and said first reference pulses for sequentially storing one or the other binary state upon each pulse of the sequence when its duration exceeds or not the duration of the simultaneous reference pulse, respectively,
   a decoding matrix being coupled to a first position of the shift register means for delivering an output indicating when said first portion of the shift register means contains a predetermined sequence of binary information associated to the receiver,
   warning means responsive to said output indication of the decoding means,
   a second monostable multivibrator coupled to the receiver means and operative upon each leading edge of an output pulse thereof to deliver a second reference pulse having a duration greater than both durations $t1$ and $t2$ but lower than the duration of said initial pulse and said information-starting pulse, first logic gate means connected to said receiver means and second monostable multivibrator, to give an output indicating the part of the duration of an incoming pulse in excess of that of the simultaneous second reference pulse, the first logic gate means being coupled to said shift register means to reset it when a received pulse exceeds the duration of said second reference pulse, a bistable means coupled to the output of the decoding matrix for being set when said output indicates predetermined sequence being contained in said first portion of the shift register, means coupled to the output of the first logic gate means to discriminate said initial pulse from said starting-information pulse and to reset the bistable means in response to the initial pulse, an alphanumerical display means, another decoder having an enabling input and being coupled between a second portion of the shift register means and the alphanumerical display means to decode the binary information of the shift register means and correspondingly control the alphanumeric display means, and second logic means connected at least to said bistable means and coupled to said other decoder to enable it when the bistable means is set, indicating that a sequence of information is received.

3. Receiver in accordance with claim 2, wherein said first portion and second portion of the shift register means are the same.

\* \* \* \* \*

UNITED STATES PATENT AND TRADEMARK OFFICE
CERTIFICATE OF CORRECTION

PATENT NO. : 3,984,775
DATED : October 5, 1976
INVENTOR(S) : Leon Cariel ; Moise Levy ; Hubert Aouizerate It is certified that error appears in the above-identified patent and that said Letters Patent are hereby corrected as shown below:

The inventor's name Hubert Zouizerate should be

Hubert Aouizerate.

Signed and Sealed this

Seventeenth Day of May 1977

[SEAL]

Attest:

RUTH C. MASON
Attesting Officer

C. MARSHALL DANN
Commissioner of Patents and Trademarks